United States Patent [19]
Hensley

[11] Patent Number: 5,833,867
[45] Date of Patent: Nov. 10, 1998

[54] SYSTEM AND METHOD FOR BACKWASHING MULTIPLE FILTRATION VESSELS

[75] Inventor: Jerry Lester Hensley, Odessa, Tex.

[73] Assignee: United States Filter Corporation, Desert, Calif.

[21] Appl. No.: 566,267

[22] Filed: Dec. 1, 1995

[51] Int. Cl.$^6$ .......................... B01D 35/12; B01D 37/00
[52] U.S. Cl. ........................ 210/792; 210/142; 210/143; 210/189; 210/275; 210/277
[58] Field of Search ................... 210/189, 269, 210/284, 792, 795, 143, 275, 142, 277

[56] References Cited

U.S. PATENT DOCUMENTS

| | | |
|---|---|---|
| Re. 25,761 | 4/1965 | Hirs . |
| 2,136,660 | 11/1938 | Martin . |
| 2,733,138 | 1/1956 | Clark ......................................... 51/303 |
| 2,855,364 | 10/1958 | Roberts . |
| 3,550,774 | 12/1970 | Hirs . |
| 3,557,955 | 1/1971 | Hirs . |
| 3,557,961 | 1/1971 | Stuart, Sr. . |
| 3,737,039 | 6/1973 | Hirs . |
| 3,757,954 | 9/1973 | Toth . |
| 3,780,861 | 12/1973 | Hirs . |
| 3,812,969 | 5/1974 | Maroney . |
| 3,992,291 | 11/1976 | Hirs . |
| 4,139,473 | 2/1979 | Alldredge ............................... 210/279 |
| 4,197,205 | 4/1980 | Hirs ........................................ 210/275 |
| 4,246,102 | 1/1981 | Hielmner et al. . |
| 4,320,004 | 3/1982 | Schecter . |
| 4,349,442 | 9/1982 | Barraque et al. ...................... 210/189 |
| 4,496,464 | 1/1985 | Hensley .................................. 210/792 |
| 4,645,604 | 2/1987 | Martinola ............................... 210/189 |
| 4,707,252 | 11/1987 | Durot ..................................... 210/151 |
| 4,787,987 | 11/1988 | Hensley .................................. 210/792 |
| 4,826,609 | 5/1989 | Hensley .................................. 210/792 |
| 4,861,472 | 8/1989 | Weis ....................................... 210/189 |
| 5,114,595 | 5/1992 | Hensley .................................. 210/792 |
| 5,635,080 | 6/1997 | Hensley .................................. 210/792 |

*Primary Examiner*—Robert J. Popovics
*Attorney, Agent, or Firm*—Wolf, Greenfield & Sacks, P.C.

[57] ABSTRACT

A filter media washing system for washing contaminants from filter media of a plurality of filtration vessels. Each filtration vessel has a filtration screen subdividing the filtration vessel into a filter media containing chamber and a filter media-free chamber. Each filter media containing chamber of each filtration vessel has a first fluid passage connected thereto and is located distally from the filtration screen. A second fluid passage is also positioned in each filter media containing chamber, but it is located proximate to the filtration screen. The first and second fluid passages are fluidly coupled, one to the other with a decontamination unit located fluidly therebetween for separating filter media from contamination carried therewith. The decontamination unit includes a contamination separating pump, a contamination separating chamber, a contamination separating screen and a return manifold. The return manifold has a first and second return conduit. The first return conduit is fluidly connected to the second fluid passage of the first filtration vessel and the second return conduit is fluidly connected to the second fluid passage of the second filtration vessel. The contamination separating pump is elevationally above and coupled to the contamination separating chamber.

16 Claims, 6 Drawing Sheets

SYSTEM AND METHOD FOR BACKWASHING MULTIPLE FILTRATION VESSELS

FIELD OF THE INVENTION

This invention relates to filtration systems. More specifically, it relates to particulate bed filtration systems that require periodic backwashing to remove the dirt and contamination accumulated within the filter bed during the filtration process.

BACKGROUND OF THE INVENTION

Filtration systems having particulate filter beds are used in several industries to remove dirt and other contaminants from fluid streams. An example is the oil industry that utilizes water and steam flooding of an oil field to enhance production yields. While it is possible to use particle bed filters to clean gases, their utilization is more common in the filtration of liquids. Often times, the fluid stream will be from a dirty water source that must be filtered to remove contaminants before use. Among others, the contamination may include solids of varying particle size and organic matter that must be removed before the water is useable for certain applications. The organic matter that must be filtered is often oil contaminants. After a filtration cycle has progressed for a period of time, the bed becomes loaded with dirt and contaminants and begins to loose its effectiveness as a filter. It may also begin to clog, preventing fluid from passing thereacross. As a remedy, the particle bed is periodically backwashed to remove the dirt and contamination from the filter media and flush the same away from the filtration system for disposal or reclamation.

Normally, the filter media is backwashed by reversing the flow of fluid through the bed to disturb the individual particles so that the dirt and contamination is released therefrom and suspended in a cleaning fluid used for the backwashing process. The cleaning fluid, together with the contamination, is then ported away from the filtration vessel. In some instances, the contamination adheres to the particles of filter media and requires physical "scrubbing" to dislodge the dirt. Scrubbing may be accomplished by turbulently flowing the filter media in cleaning fluid, or by passing fluidly suspended filter media through a circulation pump that creates sufficient shearing forces upon the contaminated particles to dislodge the adhering contamination from the filter media. General details of particle bed filters, as well as the utilization of a circulation pump for scrubbing the particles are disclosed in U.S. Pat. No. 5,114,595 covering another invention by the present inventor and the disclosure of which is expressly incorporated herein by reference.

In the event that the filter media is not scrubbed clean, certain contaminants will be retained therein and prevent the filtration bed from performing as intended. After a period of time, the bed becomes increasingly fouled by contamination that is not removable without scrubbing and the bed's effectiveness as a filter diminishes. There is a decreased effectiveness caused by the presence of the retained contamination on the individual filtration particles. It also detrimentally interferes with the interaction between the many particles in the filtration bed. Regarding the individual filter media particles, the size and shape of the granule is altered by adhering contamination. If this happens, the surface of the particle will not as effectively attract and retain contamination out of the flow stream being cleaned. The contamination may also cause the filtration particles to adhere or stick to one another. In that case, the effective surface area of the aggregated granules is reduced and filtration effectiveness declines. Furthermore, the unreleased contamination may cause greater pore space to result between the filtration particles. This fosters channeling through the bed which also decreases the filter's effectiveness.

In conventional backwashing practices, high volumes of clean fluid are used to flush contamination from the bed. This produces a similarly high volume of contaminated effluent that must be disposed of during the backwashing process. In the event that fluid having been previously cleaned by the filter bed is used for the backwash cycle, the overall production of decontaminated liquid is compromised. A further drawback associated with this design is that the upstream flow of dirty water must halt during the backwash cycle. This complicates the process by requiring coordination of the supply of dirty water with the alternating cycles of filtration and backwashing. In other cases, the supply of dirty water is merely blocked, thereby potentially damaging the supply pump that continues to run "dead headed" while fluid is prevented from passing therethrough.

At least one design for particle bed filtration systems locates the backwashing mechanisms within the housing of the filtration vessel. As such, these mechanisms are difficult to access and permit their use only in the backwashing of that particular filtration vessel within which it is housed. Furthermore, this type of design compromises the capacity of the filtration vessel by its occupation of interior space that could otherwise be dedicated to additional filter media or gas containment. In other designs, individual backwashing mechanisms are provided for each filtration vessel, but are located exteriorly thereto. In both interiorly and exteriorly located situations, however, a backwashing mechanism is provided for each filtration vessel and each backwashing unit is utilized for only a fraction of the time that the filtration system is in operation. The extended idle periods for the backwashing units result because the backwash cycle has a much shorter duration than the filtration cycle. With respect to filtering systems comprising only one filtration vessel, a continuous flow of clean water will be impossible to provide. In the case of multiple filtration vessels being combined into a filtration system for supplying a continuous flow of cleaned water, the provision of a backwashing mechanism or unit for each filtration vessel proves needlessly redundant and costly.

If a scrubbing pump is included in either exteriorly or interiorly located backwashing designs, the pump is normally positioned horizontally in-line, or level with the chamber in which the contamination is separated from the filter media. In this configuration, the scrubbing pump becomes fouled by settled filter particles if operation of the pump ceases during the backwash cycle. This can result in a binding of the pump that prevents its operation and requires costly service. Where the pump is located within the interior of the filtration vessel, service to the pump will be even more costly because the vessel itself must be opened to provide access. Equally important is the fact that the filtration vessel will not be able to operate as a filter while the backwashing mechanism is being repaired and no cleaned fluid will be produced.

Most filtration vessels employ flat filtration screen designs that are typically located horizontally across the interior of the filtration vessel. This permits the presentation of a filtration surface equal only to the cross-sectional area of the filtration vessel. In this manner, the filtration bed is supported above the flat screen and a clean water receiving area is established below the screen. In the case of the particle bed filter, it is most advantageous to maximize the volume of the filtration bed. Therefore, other shapes for the filtration screen can optimize the utilization of space within the filtration vessel while providing comparable screening surface area.

In view of the above described features and aspects of known filtration systems and methods, a need has been recognized for remedies to the deficiencies presently encountered in their utilization, and for enhancing both the construction and operation of particle bed filtration systems.

SUMMARY OF THE INVENTION

Particulate filtration beds are often utilized because of their effectiveness, ease of use, and relatively simple construction and performance. Furthermore, a relatively high degree of purification is achievable without the use of chemicals thereby making the process ecologically compatible and typically not subject to regulation. The present invention remedies the deficiencies described hereinabove with respect to known particle bed filtration systems and provides enhancements to such systems that have not been previously achieved. A primary enhancement of the present invention over previously known systems is the provision of multiple filtration vessels, each of which utilizes a common decontaminating backwashing unit or system located exteriorly to each of the vessels. This configuration provides several benefits. Economies are realized through the use of only one decontamination unit for the several filtration vessels. This greatly reduces costs by eliminating redundant washing units and improves the utilization factor of the washing unit that is provided. Further, by locating the decontamination unit outside the filtration vessel, easy access to its components is provided and space is freed within the filtration vessels. Still further, the inclusion of several filtration vessels permits a continuous stream of cleaned fluid to be produced since some number of the filters will be engaged in a filtration cycle at all times. This is even the case where only two filtration vessels are utilized because the duration of the backwash cycle is significantly shorter than the filtration cycle; therefore, one or the other of the two filtration vessels is always producing decontaminated fluid. The duration of the backwash cycle will normally be governed by the achievement of a seventy-five percent reduction in contaminant load of a dirty filtration bed.

The present invention uses the same dirty fluid stream to backwash the filtration media as is used as a source for filtered water. As a result, the flow of dirty fluid from the source is not interrupted; instead, it is simply redirected with respect to the filtration vessel. During a filtration cycle, the dirty fluid enters the top of the filtration vessel and passes through the filtration bed where it is decontaminated before flowing out of the system for end use. During the backwash process, the dirty flow is not stopped, but is merely redirected to an inlet in the bottom of the filtration vessel where it initiates the fluidization of the filter media. The use of dirty fluid in the backwash cycle is possible because the concentration of contamination in the dirty fluid stream is significantly below the contamination level in a dirt loaded filtration bed. Still further, the contamination concentration in the dirty fluid stream is low enough to sufficiently clean the bed so that when put back on-line into a filtration cycle, the dirty fluid stream is once again adequately cleaned.

A clean source of backwash fluid is not required in view of the system's use of the dirty fluid for backwashing. This eliminates the need for either a storage facility for, or a convenient supply of clean fluid and also potentiates the system's production of cleaned fluid. This is achieved by not having to use any the fluid cleaned by the filtration system in the backwashing process.

The filtration system of the present invention includes a scrubbing pump that is fluidly connected to the filtration vessel so that it also acts as a circulation pump for a fluid circuit based off of the filtration vessel. In this manner, rapid circulation of the filtration media is achieved with a flow other than clean backwashing fluid through the filtration vessel. Further, by passing the particulate filter media through the circulation or contamination separating pump, shearing forces are imposed that dislodge contamination adhering to the particles. In this manner, the filter media is scrubbed clean so that the filtration bed is regenerated for the next filtration cycle, even if the media is not completely rid of contamination.

The inflow rate of dirty fluid is maintained during the washing cycle and a like flow rate is ported from the decontamination unit. The inflow and outflow rate is significantly lower than the circulation fluid rate generated by the separating pump. In this manner, the contaminant concentration is high within the carrying fluid resulting in less water being used in the washing cycle thereby reducing disposal and storage costs for heavily contaminated effluent produced in the backwashing cycle.

By maintaining a significantly uniform and uninterrupted flow rate from the dirty fluid source during both the filtration and backwash cycles, the fluid supply pump is never dead headed, or even required to cease operation. This reduces damage and scheduled maintenance of the pump over previously known designs.

At the conclusion of the backwashing cycle, and the return of the filtration vessel back on-line to a filtration cycle, the direction of flow within the filtration vessel is reversed from the upward flow of the backwash cycle to the downward flow of the filtration cycle. As a result, the filter media is not allowed to naturally settle within the filtration vessel into strata, but instead is force set so that a particulate cross-section taken vertically through the filtration bed is substantially uniform. The uniformity induced from the force setting process produces a more efficient filter bed than one that has naturally settled. The uniformity of the bed is also enhanced by the thorough cleaning of the filter media. Because the filter particles are returned to their original shape and size by the backwashing process, or at least closely thereto, they cooperate as designed for effective filtration of the dirty fluid. Furthermore, aggregation of media particles is discouraged, as is channeling between the particles through the filtration bed as a result of the particle's once again clean status. The preferred embodiment of the present invention employees black walnut shells as the filter media that has been crushed to a standard size between 12 and 20 mesh. It has been found that black walnut shell particles behave advantageously as filter media in these types of filtration beds.

Still a further benefit of the present invention is the configuration of the several primary components of the decontamination unit. It is important that the circulation or contamination separating pump be elevationally above the balance of the unit so that if the pump ceases operation during the backwash cycle, most of the particulate matter will drain from the pump preventing its becoming fouled. In an important embodiment of the present invention, a cylindrically shaped contamination separating screen is employed that is housed within a substantially upright cylindrically shaped sleeve portion of a contamination separating chamber. The mesh of the separating screen is appropriately sized so that filter media particles are prevented from passing therethrough and are retained within the fluid flowing circuit, while smaller contamination particles are permitted to pass through the screen. An annulus is formed between the screen and sleeve through which the suspended filter media passes after being propelled through the contamination separating pump. This annulus is sized so that the filter media passes with sufficient velocity and force past the contamination separating screen so that it does not adhere thereto as a result of the suction produced by the contaminated fluid being ported therethrough.

In a lower portion of the decontamination unit, the fluidized filter media passes from the described annulus into a substantially upright and annular manifold that is subdivided at a bottom end into a plurality of return conduits. Each conduit extends away from the decontamination unit to one of the several filtration vessels in a substantially horizontal manner. If the turn from the upright portion of the manifold to the transverse return conduit is sharp and abrupt, the filter media has a tendency to pack-off and prevent circulation within the established washing circuit. To prevent this occurrence, a radially curved transition is provided to accomplish what is essentially a ninety degree turn in the piping. By providing the gradual transition, the fluidized filter media remains suspended and does not pack-off. Instead, it flows back into the filtration vessel where it either remains, or is recirculated through the decontamination unit for additional cleansing.

A further benefit of the present invention is the valving configuration provided in the filtration system for selectively establishing which of the several filtration vessels are in filtration cycles and which are in backwash cycles at any given time. By having this valving configuration, greater versatility is provided. One or more filtration vessels may be backwashed at any one time. Still further, it may be designated that none of the vessels are to be backwashed if a peak demand is experienced for cleaned fluid.

The versatility permitted by the valve configuration of the present invention is further optimized by the incorporation of a programmable logic controller (PLC) that is connected to the valves to control the operation of the system. Through the use of the PLC, the entire filtration/backwash process may be automated. The valves are of an on/off type of variable configuration from among several that are commercially available. Among those, and as an example is a butterfly valve having a pneumatic actuator and a pneumatic over electric solenoid valve that may be operated by the PLC. The PLC may also be used as a monitor for detecting the back-pressures being experienced at each filtration vessel. The back-pressure may be used to determine when backwashing is needed. If the PLC observes a sufficiently high back-pressure according to its program in any given filtration vessel, the PLC may also control the valves to affect a backwash cycle on that vessel.

This invention includes features and/or components that have been invented and selected for their individual and combined benefits and superior performance as a fluid filtration system. The system includes multiple components that individually and singularly have new and novel features in and of themselves.

Referring now to specific embodiments of the filtration system of the present invention, additional benefits and advantageous features will be appreciated. A filter media washing system for washing contaminants from filter media of multiple filtration vessels is provided. The system includes a plurality of filtration vessels, but in any case, there will be at least two filtration vessels; a first and a second filtration vessel. The filtration vessels each have a filtration screen that subdivides the filtration vessel into a filter media containing chamber and a filter media-free chamber. The filter media containing chamber holds filter media about the filtration screen during a filtering cycle. Each filter media containing chamber of each filtration vessel has a first fluid passage connected thereto and located distally from the filtration screen. A second fluid passage is also positioned in each filter media containing chamber, but located proximate to the filtration screen. Each of the media-free chambers has a third fluid passage that is located therein and communicated therewith so that each of the fluid passages (first, second and third) provides fluid communication between an exterior and an interior of the filtration vessel. The first and second fluid passages are fluidly coupled, one to the other with a decontamination unit located fluidly therebetween for separating filter media from contamination carried therewith.

The decontamination unit includes among other components a contamination separating pump, a contamination separating chamber, a contamination separating screen and a return manifold. The separating screen is located at least partially within the contamination separating chamber. The return manifold has a plurality of return conduits and each of those return conduits includes at least a first and second return conduit. The first return conduit is fluidly connected to the second fluid passage of the first filtration vessel and the second return conduit is fluidly connected to the second fluid passage of the second filtration vessel.

In an important embodiment, the contamination separating pump is elevationally above and coupled to the contamination separating chamber.

Each of the return conduits includes a radially curved transition between a substantially upright portion of the manifold and a laterally extending portion of the return conduit. The radially curved transition facilitates the transport of suspended filter media from the decontamination unit back to the filtration vessel without packing-off therebetween.

Each first fluid passage is fluidly coupled to each of the other first fluid passages so that all first fluid passages are fluidly communicatable with the decontamination unit.

Each first fluid passage has a valve for permitting fluid flow through the first fluid passage when the valve is in an open configuration. The same valve prevents fluid flow through the first fluid passage when it is closed. Similarly, each second fluid passage comprises a valve for permitting fluid flow through the second fluid passage when that valve is in an open configuration and for preventing fluid flow through the second fluid passage when it is closed. The valves are selectively configurable so that any number of filtration vessels may be placed fluidly in communication with the decontamination unit. It is anticipated that at any one time, any number of filtration vessels may be being backwashed. This includes configurations in which no vessels are being backwashed, one vessel is being backwashed or possibly several vessels are being simultaneously backwashed. In the event that several vessels are to be backwashed at the same time, the backwashing unit must be sized accordingly to maintain the performance criteria described herein. Because of this specific sizing, the same number of filtration vessels, or at least vessels having the same aggregate capacity should be backwashed together in any one backwash cycle.

The contamination separating screen defines a filter media passage about its exterior and a contamination receiving chamber within its interior. The separating screen has a mesh size that permits the passage of contamination and prevents the passage of filter media. The contamination receiving chamber is ported to a contamination effluent chamber by a contamination bearing conduit. The contamination bearing conduit is at least partially located within an upright portion of the manifold and is oriented substantially concentrically therewith.

In one embodiment, the first, second and third fluid passages connected to a particular filtration vessel are exclusive passages permitting fluid communication with the filtration vessel's interior.

The contamination separating screen has an elongate cylindrical screen body that is concentrically oriented within a substantially upright sleeve portion of the contamination separating chamber. In this way, the passage of the filter media past, but not through the separating screen is facilitated while the passage of contamination is permitted through the separating screen and out of the fluid circuit.

The second fluid passage located proximate to the filtration screen is tangentially connected to the filtration vessel so that fluidized filter media returning to the filtration vessel through the return conduit induces toroidal flow within the filtration vessel and turbulent conditions about the filtration screen.

The contamination separating pump is positioned above the contamination separating chamber and the return manifold so that filter media settles out of the contamination separating pump when fluid flow therethrough ceases. This prevents the contamination separating pump from becoming locked by filtration media that settles therein.

A programmable logic controller is also included for controlling the operation of the filter media washing system. The programmable logic controller establishes selective fluid communication between the decontamination unit and the filtration vessels.

Each filtration vessel has a deflector plate located proximate to an inlet opening of the first fluid passage. The deflector acts as a defuser for incoming fluid into the filtration vessel through the first fluid passage and a vortex breaker when fluid is passing from the filtration vessel through the first fluid passage. When acting as a diffuser, the deflector plate prevents the inlet water from striking the media and causing it to move outward toward the edges of the filtration vessel. If the deflector were not present, the filter media forms a cone effect over the typical twenty-four hours of a filtration cycle.

In another embodiment of the present invention, a method for washing contaminants from filter media of multiple filtration vessels utilizing a single decontamination unit is disclosed. In the method, a filtration cycle is terminated in at least one filtration vessel of a plurality of filtration vessels in which contaminated fluid is being filtered through a particlized filter media to produce decontaminated fluid and contaminated filter media during the filtration cycle. The particlized filter media is fluidized so that it is suspended in carrying fluid within the filtration vessel. The fluidized filter media is transported from the filtration vessel to a decontamination unit. The decontamination unit has, in series and in elevationally descending order, a contamination separating pump and a contamination separating chamber that has a contamination separating screen located at least partially therein. The fluidized filter media is returned to the filtration vessel through a return manifold. The return manifold has a plurality of return conduits. Each of the return conduits are fluidly connected to a respective filtration vessel for return of cleaned fluidized filter media to that particular filtration vessel.

By using the manifold design of the present invention, pack-off of the fluidized filter media is prevented in the return manifold by turning the flowing fluidized filter media from a substantially horizontal direction to a direction transverse thereto through a radially curved transition; not a sharp curve.

Valve configurations are provided within the flow paths of the fluidized filter media for selectively permitting and preventing fluid flow between a particular filtration vessel and the decontamination unit. In this way, a desired number of filtration vessels may be placed in fluid communication with the decontamination unit by selectively orienting the valve configuration.

In an alternative embodiment, the sequencing of filtration and backwash cycles is automated by controlling the valve configurations by actuating each valve between open and closed positions with a programmable logic controller.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION:

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and will not be limiting. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import. Furthermore, elements may be recited as being "coupled"; this terminology's use anticipates elements being connected together in such a way that there may be other components interstitially located between the specified elements, and that the elements may be connected in fixed or movable relation one to the other. Certain components may be described as being adjacent to one another. In these instances, it is expected that such a relationship so described shall be interpreted to mean that the components are located proximate to one another, and normally, but not necessarily with an absence of other components positioned therebetween. Still further, some structural relationships or orientations may be designated with the word "substantially". In those cases, it is meant that the relationship or orientation is as described, with allowances for variations that do not effect the cooperation of the so described component or components.

Figure 1:
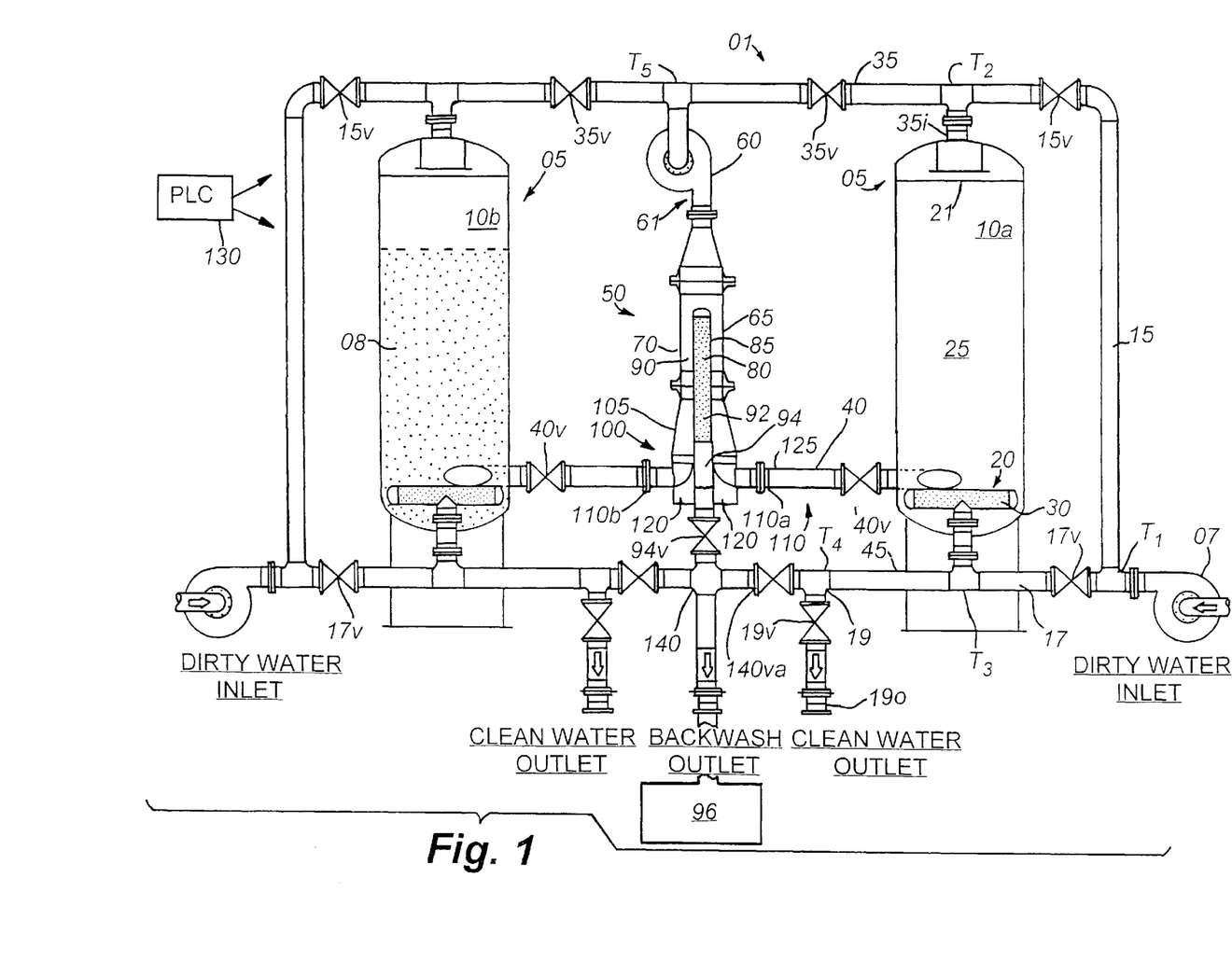
FIG. 1 is a side view of the filter media washing system having two filtration vessels, shown in partial cut-away to display interior components.
Figure 2:
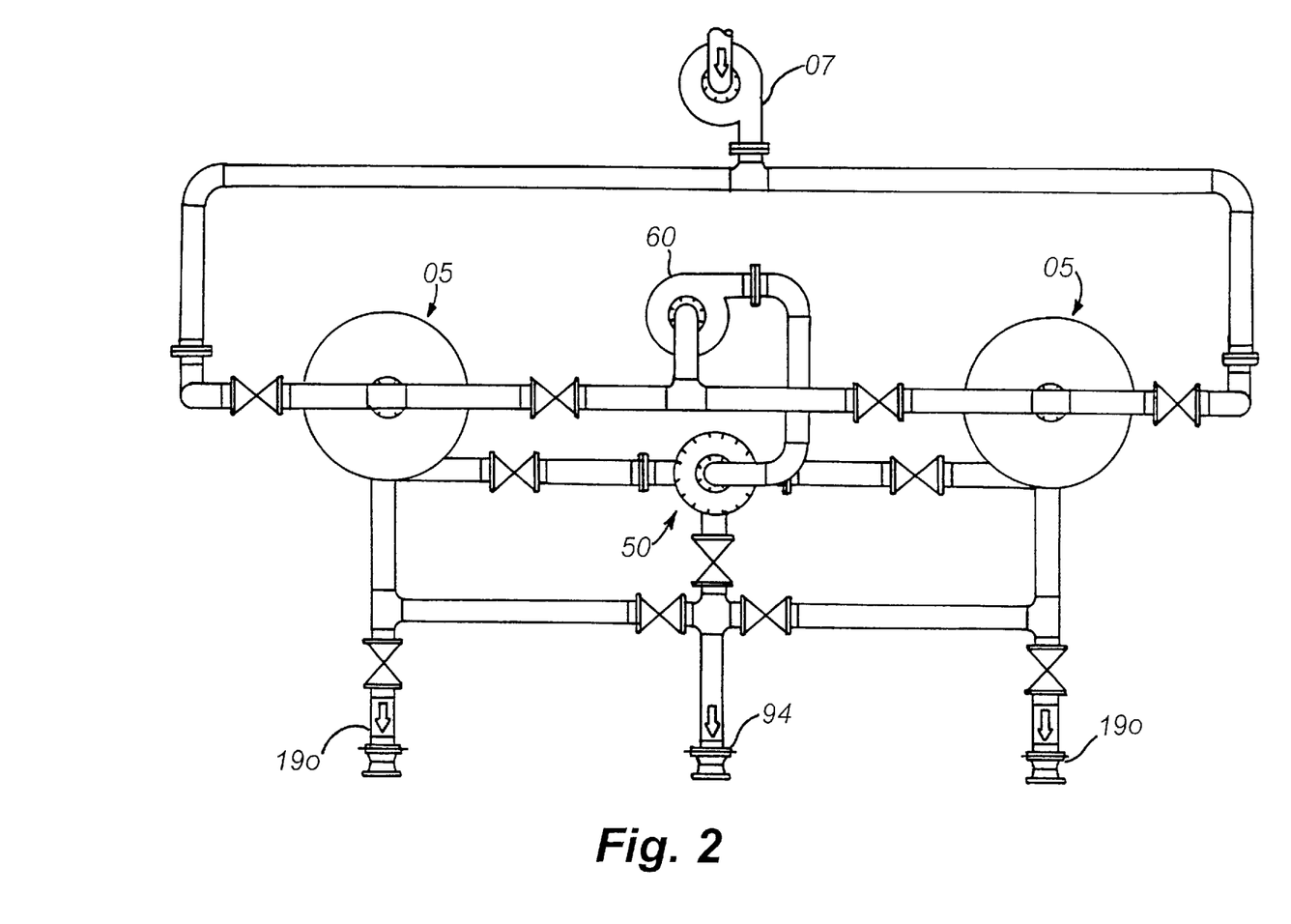
FIG. 2 is a top view of the filter media washing system having two filtration vessels.
Figure 3:
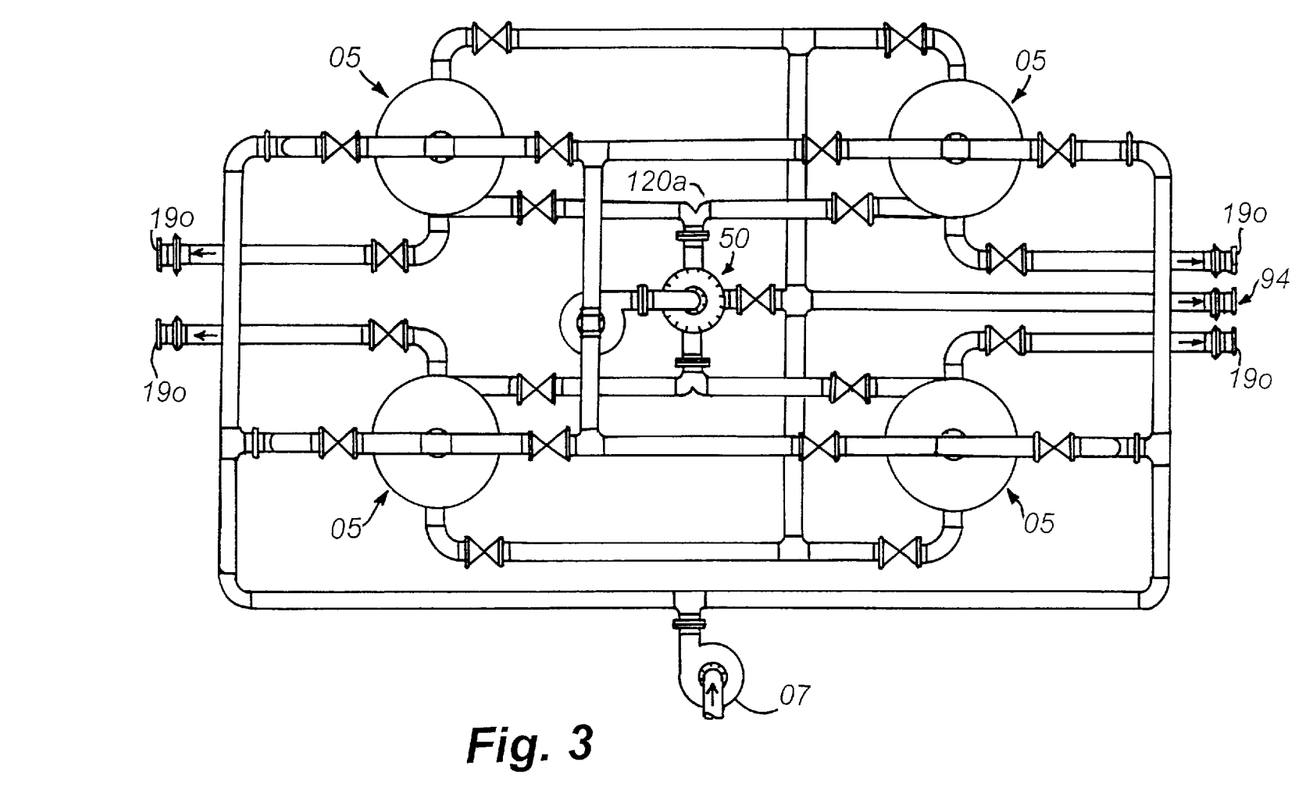
FIG. 3 is a top view of the filter media washing system having four filtration vessels.

Referring to the drawings, a particulate filter system is illustrated that includes a plurality of filtration vessels 05 that are fluidly connected to one or more decontamination units 50. Together, the filtration vessels 05 and decontamination unit 50 provide a filter media washing system 01. In the illustration of FIGS. 1 and 2, two filter vessels 05 are shown. It should be understood, however, that a plurality of vessels 05 may be included in the washing system 01 in numbers that exceed two. In the illustration of FIG. 3, there are four filtration vessels 05; in FIG. 4 there are eight vessels 05. The filtration vessels 05 may be constructed from standard pressure vessels of conventional construction having operating pressures in the forty to sixty pounds per square inch (psi) range.

In the illustrated embodiment of FIG. 1, a first filtration vessel 10a is shown to be located along side a second filtration vessel 10b. For purposes of this description, it should be understood that the construction of each filtration vessel 05 is substantially similar. Furthermore, the second filtration vessel 10b is shown during a filtering cycle wherein particulate filter media 08 is set in a bed that is downwardly force set about a filtration screen 20. In the configuration illustrated in the first filtration vessel 10a, the particulate filter media 08 is fluidized and suspended in a carrying fluid within the vessel 10a as though in a backwashing cycle.

The interior of the filtration vessel 05 is divided into two primary compartments. The first is a filter media containing chamber 25 exteriorly located with respect to the filtration screen 20. The second is a filter media-free chamber 30 located oppositely to the filter media containing chamber 25 across the filtration screen 20. In the illustrated embodiment, a substantially cylindrically shaped filtration screen 20 is utilized so that the filter media-free chamber 30 is established within an interiorly located screened area. In other embodiments, it is contemplated that a flat bottom screen may be utilized so that the filter media containing chamber 25 is located thereabove, while the filter media-free chamber 30 is located there below. In practice, any under drain type screen may be utilized, therefor one may be chosen for its effectiveness and cost saving characteristics. In the preferred embodiment, the filter media 08 has a depth of sixty-six inches. Given this depth, the filter vessel 05, or vessels 05 may be sized according to the customer's water requirements. The size of the vessel 05 is specified with reference to the vessel's 05 diameter and is computed as follows:

bwpd=total barrels of water per day required
barrel=42 U.S. gallons
NV=number of filtration vessels desired
GPM=gallons per minute
Vs=cross-sectional area of each filter vessel
Vd=filtration vessel diameter
bpfv=barrels per filter vessel per day
gpmpfv=gallons per minute per filter vessel $$gpmpfv = \frac{bpfv \times 42}{minutesperday - cleaningtime}$$

$$Vd = 2x\sqrt{\left(\frac{gpmpfv}{13.5}\right) \div \pi}$$

In general, each filtration vessel 05 operates between alternating filtration cycles wherein fluid is decontaminated and backwashing cycles wherein the dirty particulate filter media 08 is cleaned or decontaminated. The filtration cycle lasts a comparatively long period of time in comparison to the backwashing cycle. As a result, the decontamination unit 50 may be utilized for cleaning or washing the filter media 08 of the plurality of filtration vessels 05. As may be appreciated from the disclosure herein, one or more filtration vessels 05 may be washed by placing each that is to be backwashed in fluid communication with the decontamination unit 50 for a backwashing cycle. Several filtration vessels 05 may be simultaneously connected to the decontamination unit 50, provided the unit 50 has sufficient capacity. It is also contemplated that the plurality of filtration vessels 05 may be sequentially cleaned by fluidly communicating each of the vessels 05 individually with the decontamination unit 50. In any event, the design of the present invention is to accommodate backwashing of two or more filtration vessels in the described manner.

It should also be understood that the fluid to be filtered by the presently disclosed filtration system is typically liquid, and most normally contaminated water. For purposes of the illustrated embodiments and those described herein, the dirty fluid to being decontaminated, or at least having its contamination level reduced, will be disclosed as it pertains to water.

During the filtration process, contaminated or dirty water is supplied through an inlet 07 and is directed to the filtration vessel 05 through a contaminated fluid conduit 15. In some cases, the inlet 07 includes a pump in conjunction therewith for supporting the provision of fluid to the filtration system. One inlet pump 07 may be provided for each filtration vessel 05, or several vessels 05 may be supplied by a single pump. In the illustrated embodiment, the contaminated fluid conduit 15 is joined to a fluidizing fluid conduit 17 by a first T-joint connection ($T_1$). A contaminated fluid valve 15v is located down stream from that T-joint connection and adjacent thereto within the fluidizing fluid conduit 17. During the filtration cycle of first filtration vessel 10a, the fluidizing valve 17v is closed so that the dirty water from inlet 07 is directed upwardly through the contaminated fluid conduit 15 and through the contaminated fluid valve 15v. A second T-joint connection ($T_2$) is provided at the top of the first filtration vessel 10a and is connected at a lower opening of the T-connection to the interior of the filtration vessel 10a. A first fluid passage 35 is established by the substantially vertical portion of the second T-joint connection together with the fluid conduit leftwardly projecting in the illustration. Located interstitially along the length of the first fluid passage 35 is first fluid passage valve 35v that is fluidly connected to a decontamination separating pump 60. A first fluid passage inlet 35i establishes an opening and access between the first filtration vessel 10a and the first fluid passage 35. During both filtration cycles and washing cycles the inlet 35i permits fluid passage into and out of the filtration vessel 10a. During the filtration cycle, the first fluid passage valve 35v is closed so that fluid is caused to enter the filtration vessel 05 at a top end thereof through the first fluid passage inlet 35i and pass downwardly through the particulate filter media 08 where contamination is removed from the fluid. Ultimately, the contaminated fluid moves downwardly through the particulate bed and is decontaminated as it reaches a lower portion of the filtration vessel 05 where the filtration screen 20 is located.

The filtration screen 20 is configured so that particulate filter media 08 is prevented from passing therethrough, but decontaminated water is permitted to pass through the screen 20 and out of the filtration vessel 05 to a clean water receptacle (not shown). A third T-joint connection ($T_3$) is provided at the lower end of the filtration vessel 05. During a filtration cycle, the cleaned water is directed through a decontaminated fluid conduit 19 and out to the clean water receptacle through a decontaminated fluid valve 19v. A fourth T-joint connection ($T_4$) is provided above the decontaminated fluid valve 19v and adjacent to a juncture valve 140va. During the filtration process, the decontaminated fluid valve 19v is opened while the juncture valve 140va is closed. In this embodiment, the lower port and passage through which decontaminated water passes is described as a third fluid passage 45.

A second fluid passage 40 is connected to the filtration vessel 05 in the lower portion of the vessel 05 proximate to the filtration screen 20. The second passage 40 is opened and closed by a second fluid passage valve 40v that in the filtration cycle is closed. As will be described in greater detail hereinbelow, the second fluid passage 40 is tangentially connected to the filtration vessel 05 so that toroidal circular flow is established within the interior of the filtration vessel 05 when fluid is injected into the vessel 05 from the second fluid passage 40.

During the filtration cycle, a flow path is established from the contaminated fluid inlet pump 07 up to the second T-joint connection ($T_2$) at the top of the filtration vessel 05 and through the contaminated fluid valve 15v as it passes through the contaminated fluid conduit 15. The dirty water enters the filtration vessel 05 through the first fluid passage inlet 35i where it strikes a deflector plate 21 upon entering the interior of the vessel 05. The third fluid passage 45 is open and provides an outlet for fluid to pass from the filtration vessel 05. As a result, the dirty fluid passes downward through the filtration vessel 05 and the set particulate filter media bed where the fluid is decontaminated as the contamination carried therein is trapped in the filter media 08. Ultimately, the now cleaned fluid reaches the filtration screen 20 and passes from the filter media containing chamber 25 across the filtration screen 20 and into the filter media-free chamber 30. From the filter media-free chamber 30, the clean fluid passes through the third T-joint connector and is directed leftwardly because of the closed fluidizing valve 17v. The fluid flows toward the fourth T-joint connection located above the decontaminated fluid or clean water outlet 19o in the decontaminated fluid conduit 19. Because the decontaminated fluid valve 19v is opened and the juncture valve 140va is closed, the cleaned water is directed away from the filtration system to a clean water receptacle for either storage or end use.

As described, a backwash cycle is alternated between each filtration cycle and during which contamination which has been filtered from the dirty water is removed from the particulate filter media 08. In this manner, the filtration capabilities of the bed are rejuvenated and additional water may subsequently be cleaned. The filtration cycle terminates and the backwashing cycle begins either after thirty hours or some other specified amount of time lapses, a designated differential pressure (normally less than 18 psi) is detected across the filtration vessel 05, or an operator manually starts the backwash process. To initiate the cleaning cycle, what had been downward flow through the filtration bed is now reversed to an upward direction and the filtration media 08 is carried to the decontamination unit 50 where the contamination or dirt is separated from the particulate filter media 08 and disposed of by the filter media washing system 01. In the illustrated embodiment, dirty water is used as the backwashing or carrying fluid. This is possible because the concentration of contamination within the dirty water is significantly less than the heavily contaminant loaded filter media at the conclusion of a filtration cycle. Therefore, the dirty water is sufficiently clean to be used to reduce the contamination levels or loads within the filtration bed.

In order to redirect the inlet water flow to the bottom end of the filtration vessel 05 through the third fluid passage 45, the fluidizing valve 17v is opened and the contaminated fluid valve 15v is closed. At approximately the same time, the first fluid passage valve 35v is opened to permit flow from the filtration vessel 05 to the decontamination separating pump 60. As a result, the fluid flows through the first T-joint connection leftwardly and upwardly at the third T-joint connection as a result of the decontaminated fluid valve 19v and juncture valve 140va being closed, while a contamination conduit valve 94 is opened. The now upwardly passing fluid enters the filter media-free chamber 30 at the interior of the filtration screen 20 and passes therefrom into the filter media containing chamber 25. The water is injected at a rate sufficient to fluidize the set particulate filter media bed by causing the filter media particles 08 to become suspended in what is now carrying fluid established by the dirty water pumped therein.

At the beginning of this cycle, a venting sequence is affected that drives out collected fluids from the top of the filtration vessel 05. The venting process completely fills the vessel 05 with carrying fluid from the inlet 07 thereby expressing the collected fluids, as well as an amount of the carrying fluid through the first fluid passage, the separating pump and at least a portion of the decontamination unit. During the venting process, approximately four to five percent of the filtration vessel's 05 volume will be expressed. These collected fluids may comprise both liquid and gaseous state compounds which are potential contaminants and must be handled as such. Furthermore, in the event of gaseous elements, it is necessary to vent them from the system before the contamination separating pump 60 is engaged for pulling the now fluidized filter media from the filtration vessel 05 and pushing it through the decontamination unit 50. Either during or subsequent to the venting process, the second fluid passage valve 40v is opened so that a fluid circuit is established between the filtration vessel 05 and the decontamination unit 50. In this manner, it is possible to circulate the fluidized filter media 08 through the decontamination unit 50 in a continuous fashion until the filter media 08 is sufficiently cleaned.

Figure 5:
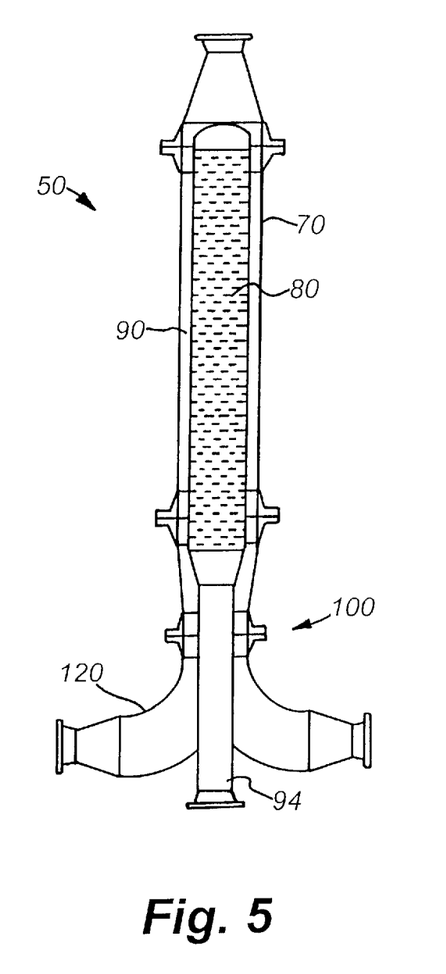
FIG. 5 is a cut-away side view of the decontamination unit:, including the return manifold.
Figure 7:
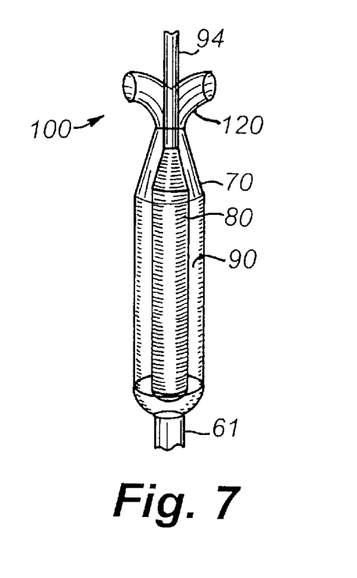
FIG. 7 is a perspective view of the decontamination unit showing the contamination separating screen and contamination bearing conduit located concentrically therein.

Regarding the construction of the decontamination unit 50, the contamination separating pump 60 is shown positioned and fluidly connected to a contamination separating chamber 65 located therebelow. The separating chamber 65 comprises a substantially upright sleeve portion 70 that serves as a partial housing for a contamination separating screen 80 having any elongate cylindrical screen body 85. In the preferred embodiment, the contamination separating screen 80 is located within the upright sleeve 70 and is oriented concentrically therewith. This relationship is illustrated in FIGS. 1, 5 and 7. An annulus is created between the separating screen 80 and the sleeve 70 which establishes a filter media passage 90 through which the fluidized filter media passes adjacent to the screen 80. The sleeve 70 must be sized to maintain the velocity and gallons per minute, but not allow the media to plug or pack-off between the separating screen 80 and an interior wall of the sleeve 70. Therefore, the cross-sectional area of the sleeve 80 which corresponds to a cross-sectional area of a portion of the contamination separating chamber 65 may be calculated according to the following formula:

Ms=cross-sectional area of the contamination separating chamber's sleeve

Mr=radius of the contamination separating chamber's sleeve

Ss=cross-sectional area of the separating screen

Md=diameter of the contamination separating chamber's sleeve

Ps=cross-sectional area of the contamination separating chamber's inlet and outlet pipes $$Ms=\pi(Mr)^2 \geq Ps+Ss$$

To assure that the annulus space between the separating screen and sleeve is adequate, the following relationship should be verified:

$$Ms-Ss \geq Ps$$

The mesh of the round wedge wire screen used in the provision of the separating screen 80 is appropriately sized so that contamination washed from the filter media 08 passes therethrough, but the filter media 08 itself is positively retained and prevented from passing. In a preferred embodiment, the screen 80 has a slot width of 0.020 inches, with an open area of thirteen percent. In the case of the cylindrically shaped contamination separating screen 80, also referred to as a media retention screen 80, the screen may be sized for a particular filtration vessel 05 according to the following formula:

Vs=cross-sectional surface area of the filtration vessel

Vd=diameter of the filtration vessel

Vr=radius of the filtration vessel

St=total surface area of the filtration screen

Sd=diameter of the filtration screen

Sl=length of the filtration screen (same as diameter of filtration vessel)

The filtration screen surface area should be greater than forty percent of the cross-sectional area of the filtration vessel.

$$Vs=\pi(Vr)^2$$

$$Sd=(Vs \times 0.4 \times 144) \div (Vd \times 12) \div (\pi)$$

$$St \geq Vs(0.4)$$

$$St=\pi(Vd)(Vl)$$

The differential pressure across the screen 80 should not be greater than 60 psid. As a result, the fluidized filter media 08 is directed about and past the contamination separating screen 80 while the smaller contaminating substances pass therethrough and into a contamination receiving chamber 92 which is at least partially defined within the cylindrical screen body 85 of the separating screen 80. From the receiving chamber 92 the dirt or contamination is removed from the filter media washing system 01 through a contamination bearing conduit 94 through the contamination conduit valve 94*v*. The contamination bearing conduit 94 passes across a backwash juncture 140 which is controlled by three valves on three of four joined conduits. The fourth conduit is not valve controlled in the illustrated embodiment and permits discharge to a contamination effluent chamber 96.

Figure 4:
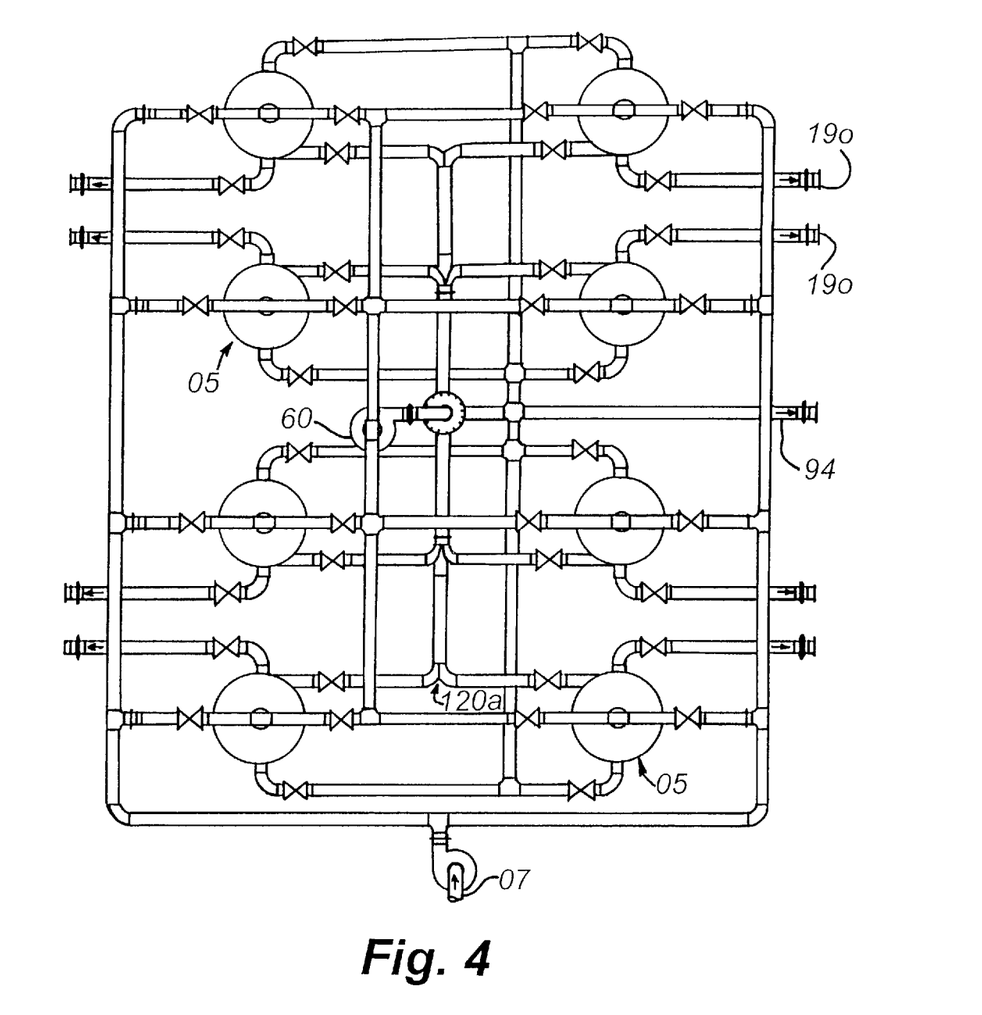
FIG. 4 is a top view of the filter media washing system having eight filtration vessels.
Figure 6:
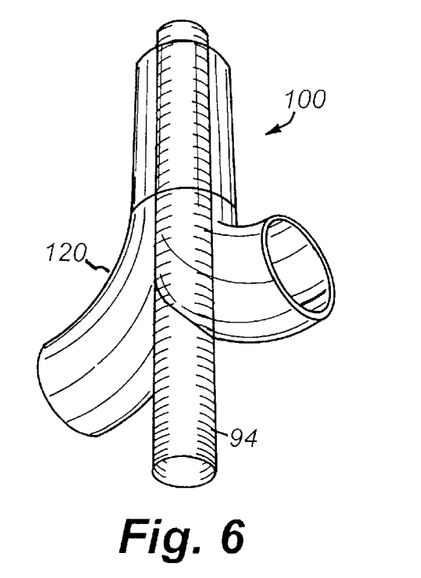
FIG. 6 is a perspective view of the return manifold with a contamination bearing conduit concentrically located therein.
Figure 8:
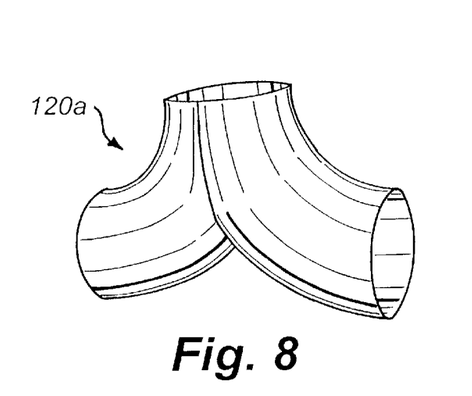
FIG. 8 is a perspective view of a two-way radially curved transition located within the laterally extending portion of the return conduit.
Figure 9:
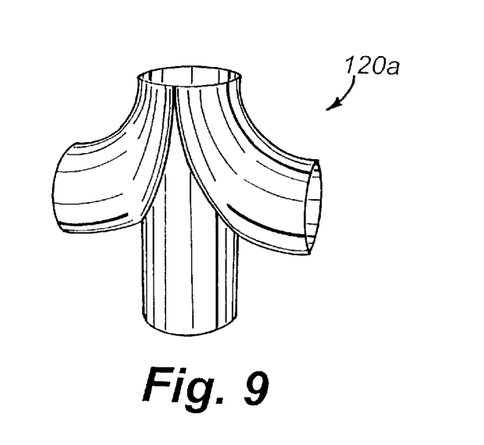
FIG. 9 is a perspective view of a three-way radially curved transition located within the laterally extending portion of the return conduit.

After passing through the filter media passage 90, the now at least partially cleaned particulate filter media 08 passes downwardly into a return manifold 100. The manifold 100 comprises an upright portion 105 that is at least partially concentrically located about the contamination bearing conduit 94. This relationship is illustrated in FIGS. 1, 5 and 6. From this substantially upright position and orientation, the return manifold subdivides into a plurality of return conduits 110. There is an equal number of return conduits 110 as there are filtration vessels 05 included in the filter media washing system 01. For purposes of the illustrated embodiment, two return conduits 110 are illustrated as a first return conduit 110*a* and second return conduit 110*b*. The first return conduit 110*a* is fluidly connected to the first filtration vessel 10*a*, while the second return conduit 110*b* is fluidly connected to the second filtration vessel 10*b*. The upright portion 105 of the manifold 100 is fluidly connected to a laterally extending portion 125 of the return conduit 110 by a radially curved transition 120. The radially curved transition 120 is configured upon a sufficiently large radius that a comparatively gentle curve is established. The radially curved transition 120 facilitates the flow of the fluidized particulate filter media 08 from the substantially vertical flow within the upright portion 105 to the substantial horizontal flow within the laterally extending portion 125 of the return manifold 100. The configuration of the transition 120 maintains a sufficient cross-sectional area and velocity through the manifold 100 to prevent pack-off of the suspended filter media. Without this transition 120, the filter media 08 tends to aggregate and pack-off at the curve resulting in a plug that prevents the continuance of the backwash cycle. Similar lateral radially curved transitions 120*a* are incorporated along the return conduits 110 at turning junctures as illustrated in FIGS. 3, 4, 8 and 9. FIGS. 3 and 8 illustrate a two-way intersection while FIGS. 4 and 9 illustrate a three-way intersection or distribution. The design criteria for these lateral radially curved transitions 120*a* is the same as described herein with regard to the radially curved transitions 120 associated with the return manifold 100. In most instances, however, the transitions 120*a* are horizontally oriented while the transitions 120 out of the manifold 100 are vertically oriented.

The pump discharge pipe 61 from the contamination separating pump 60 to the contamination separating chamber 65 and the return conduits 110 are similarly sized according to two sets of design criterion. The first is that at least a minimum amount of liquid must be pumped past the filtration screen 20 into the filtration vessel 05 to fluidize the media 08; the second is that at least a minimum fluid velocity must be maintained within the fluid circuit through the decontamination unit 50 to keep the filter media 08 in suspension and to scrub or shear the particles of contamination from the media 08. Accordingly, the pump discharge pipe and the return conduits 110 are optimally sized as follows:

Pd=pipe diameter in inches
GPM=gallons per minute
Pv=pipe velocity (must be greater than or equal to) fifteen feet per second)
GPM=(Vs×13.5)×2.3

$$Pd = \sqrt{(GPM \times 0.4085) \div Pv}$$

To assure that the velocity within the pipe will be greater than fifteen feet per second (Fps), the following formula may be used:

$$FPs = \frac{(GPM \times 0.4085)}{(Pd)^2}$$

As previously described, the second fluid passage 40 is tangentially connected to a respective filtration vessel 05. As the filter media 08 is pumped back into the filtration vessel 05 under the power of the contamination separating pump 60, a whirlpool or toroidal flow pattern is achieved because of the joinder established between the second fluid passage 40 and the filtration vessel 05. The whirlpool effect assists the suspension of filter media 08 into the carrying fluid. Furthermore, by locating the inlet of the second fluid passage 40 adjacent to the filtration screen 20, turbulence is also encouraged in that location which assures that the set particulate bed located about the filtration screen 20 will be disturbed and fully suspended for backwashing and decontamination. The force with which the suspended filter media 08 is returned to the filtration vessel 05 is sufficient to cause a jetting action into the media bed that further breaks it up and liquefies the bed.

When a sufficient amount of contamination or dirt has been washed from the particulate filter media 08, the backwash cycle is concluded. The cessation of the backwash cycle and transition back to the filtration cycle begins by opening the contaminated fluid valve 15*v* and the juncture valve 140*va*. This allows fluid to enter the filtration vessel 05 from the top inlet 35*i* and clear the top portion of the vessel 05 of suspended filter media 08. At the same time, the fluidizing valve 17*v* and the contamination conduit valve 94*v* are closed. In this manner, substantially particle free fluid is made available to the intake of the separating pump 60 which clears the pump 60 of particulate matter. The first fluid passage valve 35*v* and the second fluid passage valve 40*v* are then closed and the pump 60 is shut down, free of potentially harmful solids. In this manner, the particulate filter media 08 within the filter media containing chamber 25 is force set back into a bed configuration that will once again trap contamination and filter it from the dirty water stream. As a last step in cleansing, the filter bed is purged. Purging removes the dirty fluid and heavy contaminants that remain in the bottom of the vessel after the backwashing procedure. For this, the juncture valve 140*va* remains open so that heavily contaminant loaded purging fluid is ported to the effluent chamber 96. In order to fully place the system 01 back onto a filtration cycle, the juncture valve 140*va* is closed and the decontaminated fluid valve 19*v* is opened thereby reestablishing decontaminated fluid production.

As described hereinabove the present invention is configured so that a single decontamination unit 50 may be utilized to backwash filter media 08 from several filtration vessels 05. The achievement of establishing backwash cycles relative to different filtration vessels 05 is accomplished by the valving configuration included within the filter media washing system 01 and illustrated with respect to the first and second filtration vessels 10*a*,10*b* in FIG. 1. It may be appreciated that after the conclusion of the backwash cycle and re-establishment of a filtration cycle in the first filtration vessel 10*a*, the valving may then be reconfigured to initiate and execute a backwash cycle of the second filtration vessel 10*b*. This is easily accomplished by actuating the valves associated with the second filtration vessel 10*b* in a similar fashion to that described above with respect to the first filtration vessel 10*a*. During backwashing of subsequent filtration vessels 05, the filtration cycle of the other vessels 05 continues uninterrupted because of the insolation capabilities of the valving configuration.

While the sequencing described hereinabove with respect to the several valves and their periodic opening and closing may be manually affected, it is desirable to include a programmable logic controller (PLC) 130 that may be coupled to each valve to initiate and control their opening and closing. As a result, the filtration system and filtration process that includes several filtration vessels and potentially several decontamination units, may be automated. This eliminates the need for operator control to effect the alternating processes between filtration and backwash of each filtration vessel 05 and the sequencing of the backwash procedures among several filtration vessels 05. In the event that a particular application requires more filtration vessels 05 to be added than are supportable by a single decontamination unit 50, additional units 50 may be added and coordinated through the PLC 130. In almost every case, however, the number of decontamination units 50 will be less than the number of filtration vessels 05.

A filtration system and its components have been described herein, together with a means for backwashing the filtration system that together have been characterized as a filter media washing system. These and other variations which will be appreciated by those skilled in the art are within the intended scope of this invention as claimed below. As previously stated, detailed embodiments of the present invention are disclosed herein; however, it is to be understood that these disclosed embodiments are merely exemplary of the invention that may be embodied in various forms.

What is claimed and desired to be secured by letters patent is as follows:

1. A filter media washing system for washing contaminants from filter media of multiple filtration vessels; said system comprising:

a plurality of filtration vessels, said plurality of filtration vessels comprising at least a first and a second filtration vessel, said filtration vessels each having a filtration screen that subdivides said filtration vessel into a filter media containing chamber and a filter media-free chamber, said filter media containing chamber having filter media contained therein and supported about said filtration screen during a filtering cycle;

each of said media containing chambers having a first fluid passage located distally from said filtration screen and a second fluid passage located proximate to said filtration screen, and each of said media-free chambers having a third fluid passage located therein so that each of said fluid passages provides fluid communication between an exterior and an interior of said filtration vessel;

said first and second fluid passages being fluidly coupled and having a decontamination unit located fluidly therebetween for separating said filter media from contamination carried therewith;

said decontamination unit comprising a contamination separating pump, a contamination separating chamber having a contamination separating screen located at least partially therein, and a return manifold having a plurality of return conduits, said plurality of return conduits comprising at least a first and a second return conduit, said first return conduit being fluidly connected to said second fluid passage of said first filtration vessel and said second return conduit being fluidly connected to said second fluid passage of said second filtration vessel.

2. The filter media washing system for washing contaminants from filter media of multiple filtration vessels as recited in claim 1, wherein said contamination separating pump is elevationally above and coupled to said contamination separating chamber.

3. The filter media washing system for washing contaminants from filter media of multiple filtration vessels as recited in claim 1, wherein each of said return conduits comprises a radially curved transition between a substantially upright portion of said manifold and a laterally extending portion of said return conduit, said radially curved transition facilitating the transport of suspended filter media from the decontamination unit to said filtration vessel without packing-off therebetween.

4. The filter media washing system for washing contaminants from filter media of multiple filtration vessels as recited in claim 1, wherein each first fluid passage is fluidly coupled to each of the other first fluid passages so that all first fluid passages are fluidly communicatable with said decontamination unit.

5. The filter media washing system for washing contaminants from filter media of multiple filtration vessels as recited in claim 4, wherein each first fluid passage comprises a valve for permitting fluid flow through said first fluid passage in an open configuration and preventing fluid flow through said first fluid passage in a closed configuration, and each second fluid passage comprises a valve for permitting fluid flow through said second fluid passage in an open configuration and preventing fluid flow through said second fluid passage in a closed configuration, said valves being selectively configurable so that any number of filtration vessels may be fluidly communicated with said decontamination unit.

6. The filter media washing system for washing contaminants from filter media of multiple filtration vessels as recited in claim 1, further comprising:

said contamination separating screen defining a filter media passage exterior thereto and a contamination receiving chamber interior thereto, said separating screen having a mesh size that permits the passage of contamination and prevents the passage of said filter media, and said contamination receiving chamber being fluidly connected to a contamination effluent chamber by a contamination bearing conduit located at least partially within an upright portion of said manifold and oriented substantially concentrically therewith.

7. The filter media washing system for washing contaminants from filter media of multiple filtration vessels as recited in claim 1, wherein said first, second and third fluid passages of any one filtration vessel are exclusive passages permitting fluid communication to said filtration vessel.

8. The filter media washing system for washing contaminants from filter media of multiple filtration vessels as recited in claim 1, wherein said contamination separating screen comprises an elongate cylindrical screen body that is concentrically oriented within a substantially upright sleeve portion of the contamination separating chamber thereby facilitating the passage of said filter media past said separating screen and permitting the passage of contamination through said separating screen.

9. The filter media washing system for washing contaminants from filter media of multiple filtration vessels as recited in claim 1, wherein said second fluid passage proximately located to said filtration screen is tangentially connected to said filtration vessel so that fluidized filter media returning to said filtration vessel through said return conduit induces toroidal flow within the filtration vessel and turbulent conditions about said filtration screen.

10. The filter media washing system for washing contaminants from filter media of multiple filtration vessels as recited in claim 1, wherein said contamination separating pump is positioned above said contamination separating chamber and said return manifold so that filter media settles out of said contamination separating pump when fluid flow therethrough ceases thereby preventing said contamination separating pump from becoming locked by filtration media.

11. The filter media washing system for washing contaminants from filter media of multiple filtration vessels as recited in claim 1, said filter media washing system further comprising:

a programmable logic controller for controlling operation of said filter media washing system, including selective establishment of fluid communication between said decontamination unit and said filtration vessels.

12. The filter media washing system for washing contaminants from filter media of multiple filtration vessels as recited in claim 1, each filtration vessel further comprising:

a deflector plate located proximate to an inlet opening of said first fluid passage that acts as a diffuser for incoming fluid into said filtration vessel through said first fluid passage and a vortex breaker when fluid is passing from said filtration vessel through said first fluid passage.

13. A method for washing contaminants from filter media of multiple filtration vessels utilizing a single decontamination unit; said washing method comprising the following steps:

terminating a filtration cycle in at least one filtration vessel of a plurality of filtration vessels in which contaminated fluid is filtered through a particlized filter media to produce decontaminated fluid and contaminated filter media during the filtration cycle;

fluidizing said particlized filter media so that said particlized filter media is suspended in carrying fluid within said filtration vessel;

transporting said fluidized filter media from said filtration vessel to a decontamination unit, said decontamination unit comprising in series and in elevationally descending order a contamination separating pump and a contamination separating chamber having a contamination separating screen located at least partially therein; and returning said fluidized filter media to said filtration vessel through a return manifold, said return manifold having a plurality of return conduits, one of said plurality of return conduits being fluidly connected to said filtration vessel for return of cleaned fluidized filter media.

14. The method for washing contaminants from filter media of multiple filtration vessels utilizing a single decontamination unit as recited in claim 13; wherein said step of returning said fluidized filter media to said filtration vessel through said return manifold further comprises:

preventing pack-off of said fluidized filter media in said return manifold by turning said flowing fluidized filter media from a substantially horizontal direction to a direction transverse thereto through a radially curved transition.

15. The method for washing contaminants from filter media of multiple filtration vessels utilizing a single decontamination unit as recited in claim 13; said method further comprising:

providing valve configurations within flow paths of the fluidized filter media for permitting and preventing fluid flow between a particular filtration vessel and said decontamination unit; and placing a desired number of filtration vessels in fluid communication with said decontamination unit by selectively orienting said valve configuration.

16. The method for washing contaminants from filter media of multiple filtration vessels utilizing a single decontamination unit as recited in claim 15; said method further comprising:

automating sequencing of filtration and backwash cycles by controlling the valve configurations by actuating each valve between open and closed positions with a programmable logic controller.

\* \* \* \* \*